(12) United States Patent
Vartiainen et al.

(10) Patent No.: US 11,248,805 B2
(45) Date of Patent: Feb. 15, 2022

(54) AIR FILTER FOR GREASE FILTERING

(71) Applicant: JEVEN OY, Mikkeli (FI)

(72) Inventors: Seppo Vartiainen, Mikkeli (FI); Jyrki Hamalainen, Mikkeli (FI); Karna Dahal, Mikkeli (FI)

(73) Assignee: JEVEN OY, Mikkeli (FI)

( * ) Notice: Subject to any disclaimer, the term of this patent is extended or adjusted under 35 U.S.C. 154(b) by 565 days.

(21) Appl. No.: 15/577,566

(22) PCT Filed: May 25, 2016

(86) PCT No.: PCT/FI2016/050355
§ 371 (c)(1),
(2) Date: Nov. 28, 2017

(87) PCT Pub. No.: WO2016/193533
PCT Pub. Date: Dec. 8, 2016

(65) Prior Publication Data
US 2018/0163973 A1   Jun. 14, 2018

(30) Foreign Application Priority Data

May 29, 2015  (FI) ..................................... 20155414

(51) Int. Cl.
*F24C 15/20*   (2006.01)
*B01D 45/14*   (2006.01)
(Continued)

(52) U.S. Cl.
CPC ............ *F24C 15/205* (2013.01); *B01D 45/14* (2013.01); *B01D 46/0031* (2013.01);
(Continued)

(58) Field of Classification Search
CPC .............................. F24C 15/205; B01D 46/00
See application file for complete search history.

(56) References Cited

U.S. PATENT DOCUMENTS

| 5,632,806 | A  | 5/1997  | Galassi |
| 6,500,387 | B1 | 12/2002 | Bigelow |

(Continued)

FOREIGN PATENT DOCUMENTS

| CN | 101446427 | 6/2009 |
| CN | 203718871 | 7/2014 |

(Continued)

OTHER PUBLICATIONS

Derwent abstract for WO 2013099929 A1 (Year: 2013).*

(Continued)

*Primary Examiner* — Sean E Conley
(74) *Attorney, Agent, or Firm* — Nixon & Vanderhye

(57) ABSTRACT

The application relates according to one embodiment to an air filter for grease filtering. The filter includes a filter mounting element for installing the filter in connection with an intake opening of an air ventilation duct, at least one mechanical separation element for separating solid impurities from flowing air, and a UV source mounting element capable of being fitted with a UV source for generating UV light. The UV light and a catalyst coating present inside the filter are adapted to transform the physical state of grease flowing into the ventilation duct along with the airflow.

14 Claims, 3 Drawing Sheets

(51) Int. Cl.
- B01D 46/00 (2006.01)
- B01D 53/88 (2006.01)
- B01J 21/06 (2006.01)
- B01J 27/055 (2006.01)
- B01J 35/00 (2006.01)
- F24F 13/28 (2006.01)
- B01D 53/86 (2006.01)
- B01J 37/02 (2006.01)
- *F24F 8/22* (2021.01)
- *F24F 8/108* (2021.01)

(52) U.S. Cl.
CPC ....... B01D 53/8678 (2013.01); B01D 53/885 (2013.01); B01J 21/063 (2013.01); B01J 27/055 (2013.01); B01J 35/004 (2013.01); B01J 37/0215 (2013.01); F24C 15/2035 (2013.01); F24F 13/28 (2013.01); *B01D 2255/104* (2013.01); *B01D 2255/20707* (2013.01); *B01D 2255/802* (2013.01); *B01D 2257/70* (2013.01); *B01D 2258/0275* (2013.01); *B01D 2258/06* (2013.01); *B01D 2259/804* (2013.01); *F24F 8/108* (2021.01); *F24F 8/22* (2021.01)

(56) References Cited

U.S. PATENT DOCUMENTS

| | | | |
|---|---|---|---|
| 9,303,894 | B2 | 4/2016 | Vartiainen |
| 2002/0157661 | A1 | 10/2002 | Komberger |
| 2003/0146082 | A1* | 8/2003 | Gibson ............... F24C 15/2021 |
| | | | 204/157.3 |

FOREIGN PATENT DOCUMENTS

| | | | |
|---|---|---|---|
| EP | 2110145 | | 10/2009 |
| EP | 2 275 187 A2 | | 1/2011 |
| EP | 2699330 | | 2/2014 |
| FI | 122583 B | | 3/2012 |
| FR | 2 739 792 A1 | | 4/1997 |
| GB | 1293985 | | 10/1972 |
| JP | S59-151029 U | | 10/1984 |
| JP | H07-301445 A | | 11/1995 |
| JP | H09-4900 A | | 1/1997 |
| JP | 2005-281557 A | | 10/2005 |
| JP | 2008-175407 A | | 7/2008 |
| JP | 2015-014455 A | | 1/2015 |
| WO | 03-061717 | | 7/2003 |
| WO | 2007/112651 A1 | | 10/2007 |
| WO | 2012-101406 | | 8/2012 |
| WO | WO-2013099929 A1 * | 7/2013 | .............. F24C 15/20 |

OTHER PUBLICATIONS

Office Action in European Patent Application No. 16802630, dated Oct. 8, 2019.
Supplementary European Search Report for Application No. 16802630, dated Jan. 22, 2019.
Finnish Search Report, dated Jan. 12, 2016, from corresponding FI application No. 20155414.
International Search Report, dated Jul. 11, 2016, from corresponding PCT application No. PCT/FI2016/050355.
Office Action in European Patent Application No. 16802630, dated Jul. 16, 2020.
Finnish Office Action issued in Patent Application No. 20155414 dated Oct. 14, 2020 with English machine translation provided.

* cited by examiner ial kitchens has been enhanced by placing the intake opening of a ventilation duct above griddles and cooking surfaces and by fitting an air filter thereto. With the ventilation system in operation, the air to be removed from a kitchen is drawn across the filter into an air duct along which the filtered air flows by way of an exhaust opening out of the building.

AIR FILTER FOR GREASE FILTERING

TECHNICAL FIELD

The application relates generally to an air filter for grease filtering.

BACKGROUND

Kitchen ventilation in restaurants and institutional kitchens has been enhanced by placing the intake opening of a ventilation duct above griddles and cooking surfaces and by fitting an air filter thereto. With the ventilation system in operation, the air to be removed from a kitchen is drawn across the filter into an air duct along which the filtered air flows by way of an exhaust opening out of the building.

What can be used in the intake opening is e.g. an air filter, including a perforated disc-shaped plate which is rotated by means of an electric motor. Some of the absorbed air flows through the rotating plate's perforations into an air duct while, by virtue of the rotation, some of the air flows along the plate's surface producing an airbed thereon. Some of the airborne particles make contact with rims of the rotating plate's perforations and some with the produced airbed with which the latter particles move away from the plate. The withdrawn particles are not able to bypass the plate into the air duct but migrate into a collector vessel of the air filter to be removed therefrom during maintenance.

A problem with available filters involves e.g. small grease particles originating from the flying fat and gaseous grease which the rotating plate is not able to eliminate completely. The grease that has penetrated through perforations of the plate accumulates on elements of the filter and in the air duct, causing a fire hazard and an increased filter and air duct cleaning demand.

In addition, some of the grease migrates through the air duct along with exhaust air to the surroundings of a building, causing together with other contaminants an odor nuisance.

In addition, the grease migrated through an air duct fouls the building and its surroundings.

SUMMARY

It is one objective of the invention to overcome problems of the available air filters and to provide a simple, safe and easy-to-maintain air filter which is effective in removing liquid and/or gaseous impurities.

The one objective of the invention is attained with an air filter of claim 1, a filtering method of claim 9, and a filter system of claim 10.

The air filter according to one embodiment, which is intended for grease filtering, comprises a filter mounting element for installing the filter in connection with an intake opening of an air ventilation duct, at least one mechanical separation element for separating solid impurities from flowing air, and a UV source mounting element capable of being fitted with a UV source for generating UV light. The UV light and a catalyst coating inside the filter are adapted to transform the physical state of grease flowing into the air duct along with the airflow.

The intake opening of an air duct refers e.g. to an air duct opening by which the indoor air is drawn into the air duct for removing the same from a building along the air duct.

The catalyst coating refers e.g. to the coating or treatment of an air filter structure or components to be mounted thereon, such that it develops a surface that functions as a catalyst e.g. in catalysis or photocatalysis.

The filtering method according to one embodiment, which intended for grease filtering, is carried out with an air filter. The air filter comprises a filter mounting element for installing the filter in connection with an intake opening of an air ventilation duct, at least one mechanical separation element for separating solid impurities from flowing air, and a UV source mounting element capable of being fitted with a UV source for generating UV light. The method comprises using UV light and a catalyst coating inside the filter for changing the physical state of grease flowing along with the airflow.

The filter system according to one embodiment, which is intended for grease filtering, comprises an air filter. The air filter comprises a filter mounting element for installing the filter in connection with an intake opening of an air ventilation duct, at least one mechanical separation element for separating solid impurities from flowing air, and a UV source mounting element capable of being fitted with a UV source for generating UV light. The UV light and a catalyst coating inside the filter are adapted to change the physical state of grease flowing along with the airflow. In addition, the system comprises a control element for controlling at least one air filter.

Other embodiments are presented in the dependent claims.

BRIEF DESCRIPTION OF THE FIGURES

It is in the detailed description of the figures that embodiments of the invention are recounted more precisely with reference to the accompanying figures, in which.

DETAILED DESCRIPTION OF THE FIGURES

Figure 1A:
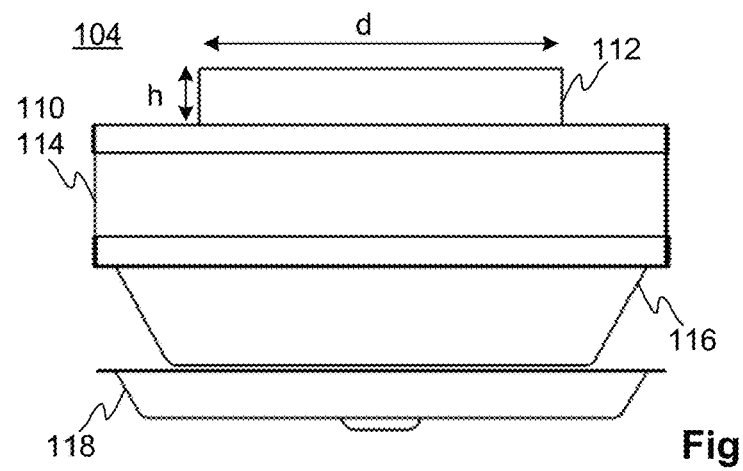
FIGS. 1a-1e show an air filter structure provided with a rotating perforated plate as seen from various directions and in cross-section.
Figure 1B:
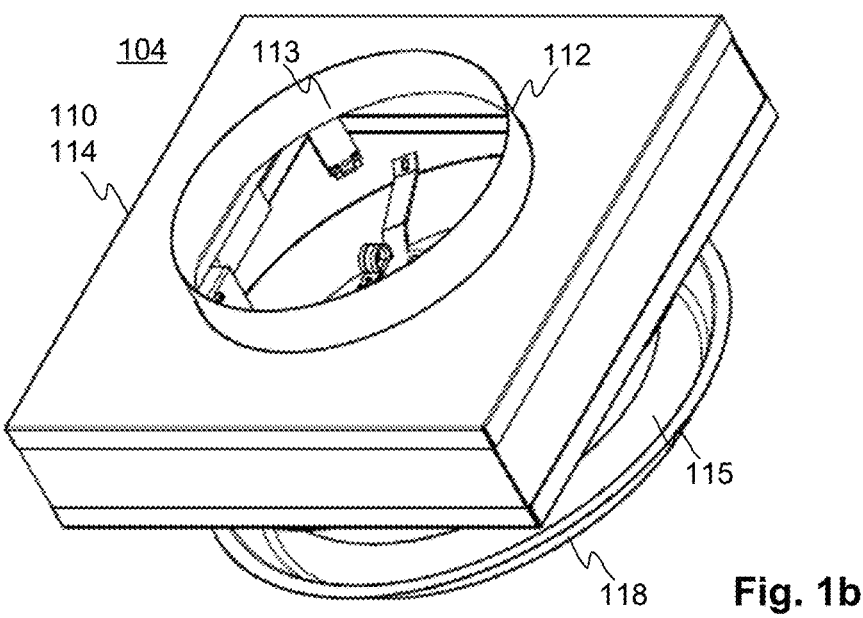
Figure 1C:
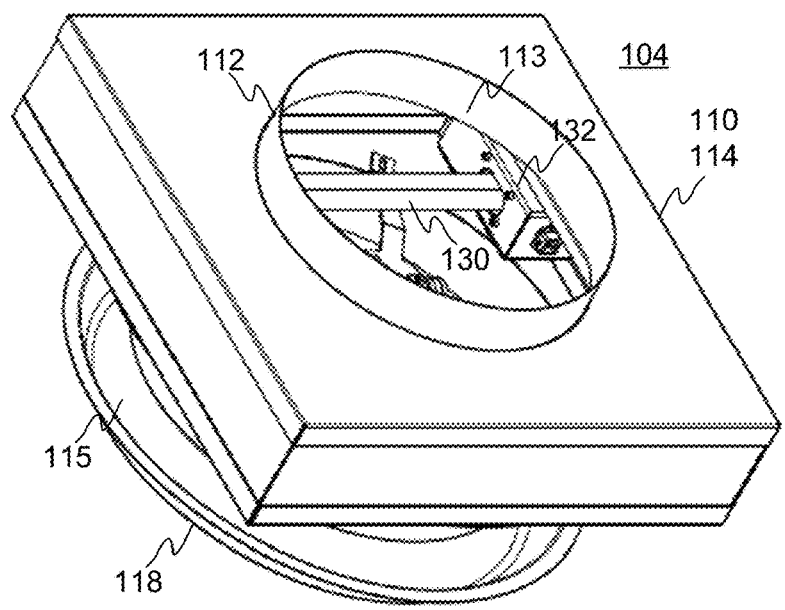

FIGS. 1a-1d illustrate a first air filter 104 for filtering liquid and/or gaseous impurities, e.g. grease, as seen from various directions. The filter 104 can be an installed fixture e.g. in a restaurant or institutional kitchen.

The filter 104 may comprise a housing 110, which can be manufactured e.g. from stainless or zinc-plated steel.

The housing 110 comprises a mounting element 112, e.g. an outlet collar, which enables installation of the filter 104 in connection with an intake opening 103 of an air ventilation duct 101, e.g. at the end of an air duct or at the connection of a ventilation ceiling structure, in such a way that the filter 104 is concentric with the air ventilation duct 101.

The mounting element 112 can have a diameter (diameter d) to enable its fitting inside the ventilation duct 101 and it is capable of being braced and detachably secured to its position on an internal wall of the ventilation duct 101.

The mounting element 112 can have its height h 0.25–1× the length of the diameter d of the mounting element 112.

In addition, the housing 110 comprises a chamber portion 114 in attachment with the mounting element 112.

The chamber portion 114 can have a surface area in the direction of an airflow 103 which is at least equal to the surface area of the mounting element 112 in the direction of the airflow 103.

Figure 1D:
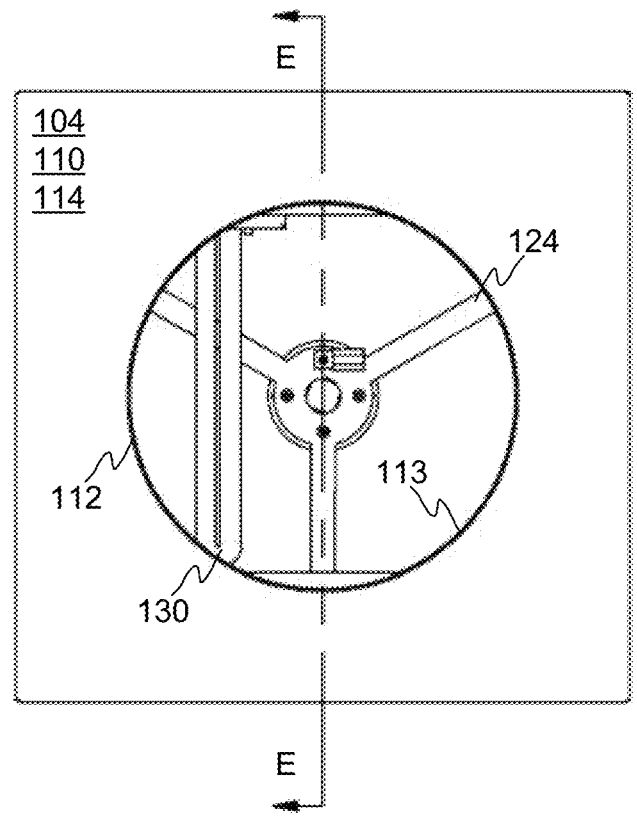
Figure 1E:
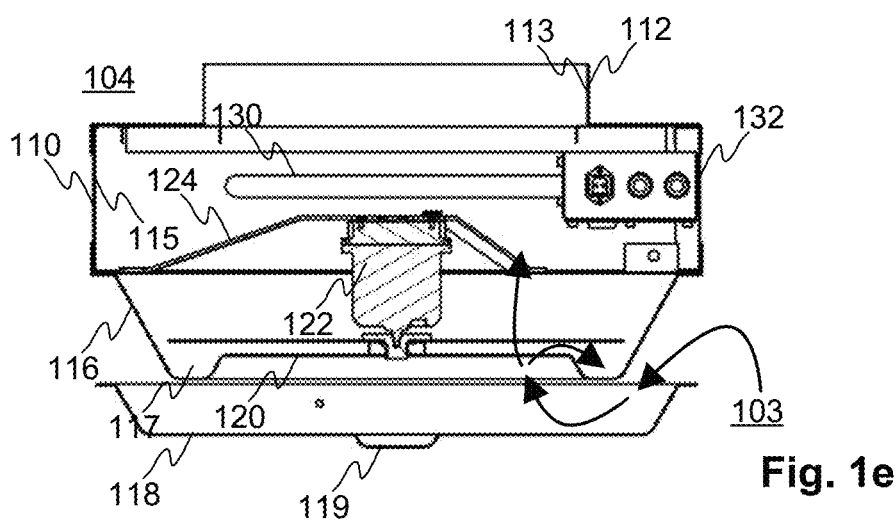

FIG. 1e shows the structure of the filter 104 from a cross-section E-E of FIG. 1d.

Inside the chamber portion 114 is fitted a mounting element 132 for a UV source 130, which is capable of being fitted with at least one UV source 130, e.g. a UV lamp, e.g. a UV led lamp or a UV fluorescent tube lamp, for generating UV light.

The UV source 130 can be provided as a non-ozone producing US source, thus improving safety of the filter 104 by eliminating the ozone-related hazards to people.

Further, by virtue of the non-ozone producing UV source 130, the construction of the filter 104 is simplified by not needing complicated safety technology because of ozone.

The housing 110 further comprises a collar portion 116 in attachment with the chamber portion 114. The truncated cone-shaped (annular) collar portion 116 can have the diameter of its bottom edge smaller than that of its top edge which lies against the chamber portion 114.

In the collar portion 116 is accommodated at least one mechanical separation element (separator, filter element) 120, e.g. a rotating perforated disc-shaped plate (separation plate), for separating impurities, e.g. dirt particles, from flowing air 103. Responsible for rotating the perforated plate 120 is a motor 122, e.g. an electric motor, which is braced with supports 124 e.g. on the chamber portion 114.

In FIG. 1d, showing the filter 104 from above, the perforated plate 120 and its motor 122 have not been presented.

The perforated plate 120 can be installed in the filter 104 by having the chamber portion 114 is between the perforated plate 120 and the mounting element 112.

In addition, the housing 110 comprises a protective dome portion 118 with a function of working as a collection tray for grease and dirt separated by the separation element 120 from the air 103.

The protective dome portion 118 comprises a discharge element 119 by means of which can be removed the grease and dirt accumulated on an internal surface 115 of the protective dome portion 118.

The filter 104 may further comprise coupling means, e.g. maintenance and safety switches, by means of which it can be connected to the power grid. It may further include a microswitch, which enables the UV source 130 and the separation element 120 to be switched off as the protective dome portion 118 is opened.

The filter 104 is energy efficient as the employed UV source 130 and motor 122 can have a joint power consumption of less than 100 W.

Inside the filter 104 can be a coated portion 112, 114, having its surface 113, 115 at least partially covered with a catalyst coating which may comprise at least titanium dioxide ($TiO_2$) and/or silver sulfate ($Ag_2SO_4$).

The coating can be present on the internal surface 115 of the chamber portion 114 and/or on the internal surface 113 of the mounting element 112.

Alternatively, or in addition to at least one of the foregoing elements 114, 112, the coating can be present on an internal surface of the collar portion 116.

Alternatively, or in addition to the foregoing, the coated portion 112, 114 can be capable of being fitted with at least one surface panel, e.g. 1-4 surface panels, covered at least partially with a coating.

The mounting element 132 can be fitted in connection with the coated portion 112, 114 in such a way that the UV source 130 is not further than e.g. 50 cm away from a coating present on the coated portion 112, 114 for maintaining the effective impact of UV light.

In addition, the mounting element 132 can be installed in connection with the perforated plate 120 which is covered at least partially with a coating.

The air 103 to be exhausted is drawn by way of an annular slit between the collar portion 116 and the protective dome portion 118 into an interior of the filter 104 where it comes across the rotating perforated plate 120. Grease and dirt are separated from the airflow 103 and proceed along with a part of the airflow 103 towards an outer rim of the perforated plate 120 and a gutter 117 present at a bottom edge of the collar portion 116. From the gutter 117, the separated impurities migrate into the protective dome 118 and can be purged therefrom by means of the discharge element 119.

The pre-scrubbed airflow 103 flows by way of apertures of the perforated plate 120 into the chamber portion 114 and/or into the mounting element 112, wherein, in a so-called post-scrubbing process, the UV light and the coating inside the filter 104 transform in photocatalysis the physical state of liquid and/or gaseous grease still flowing along with the airflow 103 towards the ventilation duct 101 by fragmenting the grease (fat molecules) into carbon dioxide, water, and a pulverized carbon compound, whereby these can be removed from the kitchen along the ventilation duct 101 with outgoing air.

It is possible to carry out post-scrubbing without UV light, since the coating transforms in catalysis the physical state of fat even without UV light.

The combination made up of the coating and UV light is effective in reducing odor nuisances.

In addition, the combination made up of the separation element 120 as well as the coating and UV light improves the grease-separating capability of the filter 104 with a minor pressure loss as the mechanical filtration takes place in just a single process with the rotating perforated plate 120.

Moreover, the filter 104 works effectively also with changing airflows 103, since the separation is effected by rotation of the perforated plate 120, not by means of the rate of speed of the airflow 103 which is the case in filters operating on centrifugal and collision principle wherein the speed of the airflow 103 and the separating capability of the filter are interdependent.

Furthermore, the filter 104 is easy to maintain, economically sensible, and has a long service life.

Figure 1F:
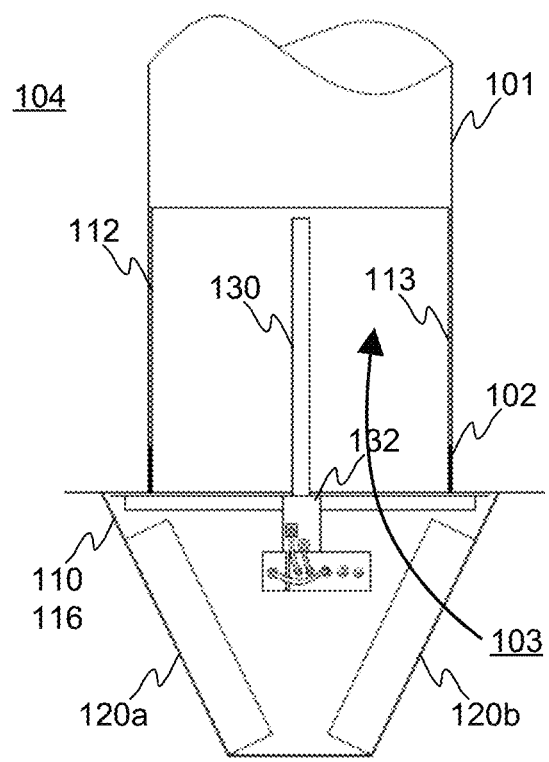
FIG. 1f shows a cross-section for an air filter fitted with fixed separators.

FIG. 1f shows another air filter 104 in a cross-section, wherein the mechanical separation is carried out with fixed separation elements 120a, 120b as opposed to the air filter 104 of FIGS. 1a-1e.

The air filter 104 has its housing 110 comprising a mounting element 112, which enables an installation of the filter 104 in connection with an intake opening 103 of an air ventilation duct 101. The mounting element 112 can have a diameter to enable its fitting inside the ventilation duct 101 and capable of being braced and detachably secured to its position on an internal wall of the ventilation duct 101.

The housing 110 further comprises a collar portion 116 attached to the mounting element 112. The collar portion 116 has accommodated therein two separation elements 120a, 120b, e.g. fixed separators.

In addition, the housing 110 comprises a mounting element 132 for a UV source 130, which is installed on the side including the collar portion 116 and which is capable of being fitted with at least one UV source 130, which can be e.g. a non-ozone producing UV source, in such a way that it will lie on the side including the mounting element 112.

A coated portion 112 of the filter 104 is made up by the mounting element 112, having its internal surface at least partially covered with a catalyst coating which may comprise at least titanium dioxide and/or silver sulfate.

Alternatively, or in addition to the foregoing, the mounting element 112 may be capable of being fitted with at least one removable surface panel, e.g. 1-4 surface panels, covered at least partially with a coating.

The mounting element 132 can be installed in connection with the mounting element 112 in such a way that the installed UV source 130 shall not be further than e.g. 50 cm away from a coating present on an internal surface 113.

The filter 104 further comprises coupling means and a microswitch matching those in the filter 104 of FIGS. 1a-1e.

The air 103 to be exhausted is drawn through the separators 120a, 120b of the collar portion 116, wherein solid grease and dirt are filtered from the airflow 103. The pre-purged airflow 103 flows into the mounting element 112, wherein, in a post-scrubbing process, the UV light and the coating transform—or the coating transforms—the physical state of liquid and/or gaseous grease flowing towards the ventilation duct 101 so as to enable its removal from the building along the ventilation duct 101.

Figure 2:
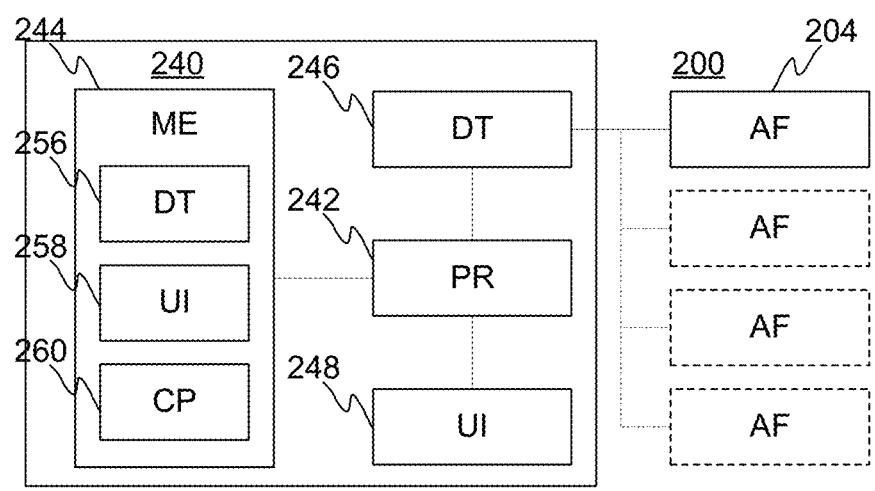
FIG. 2 shows functional units for a filter system.

FIG. 2 shows functional units 204, 240, 242, 244, 246, 250, 254, 256, 258 for a filter system 200 intended for grease filtering.

The system 200 comprises at least one filter 204 presented in the preceding figures, e.g. 1-10 filters 204.

In addition, the system 200 comprises a control unit (monitoring unit) 240.

The control unit 240 may comprise a processor component 242, which comprises at least one processor and by means of which instructions defined e.g. by a user or some application program are executed and data is processed.

The control unit 240 may further comprise a memory component 244, which comprises at least one memory and is intended for storing and maintaining e.g. instructions, application programs and operational data of the at least one filter 204.

The control unit 240 may further comprise a data transfer component 246, by means of which the control unit 240 transmits and/or receives information from each filter 204 over at least one wired and/or wireless communication link.

In addition, the control unit 240 may comprise a connection for a power source component, e.g. for at least one battery functioning as the power source or for an external power source.

The control unit 240 may further comprise a user interface component 248, by means of/over which the user is able, if necessary, to enter information into the control unit 240 and/or to receive information therefrom.

The user interface component 248 may comprise at least one of the following: a keyboard, function keys, a led display, a touchpad, a touchscreen, and a microphone/speaker unit.

The memory unit 244 may comprise at least an application 256 controlling operation of the data transfer component 246, an application controlling operation of the power source component, an application 258 controlling operation of the user interface component 248, and an application 260 controlling operation of the at least one filter 204.

The application 260, when executed by the unit 240, controls operation of at least one filter 204, e.g. the operation of its motor 122 and/or its UV lamp 130. It comprises a motor control code and a UV lamp control code, by means of which it acquires, among other things, status information about operation of the motor 122 and the UV lamp 130, transmits acquired information to a building automation system, and presents acquired status information by means of the user interface component 248, e.g. a led display.

Based on the presented status information, it is possible to focus and/or time the maintenance measures correctly.

Described above are just a few embodiments of the invention. The principle according to the invention can be varied within the scope of protection defined by the claims, regarding e.g. implementation details as well as fields of use.

The invention claimed is:

1. An air filter (104, 204) for grease filtering, comprising:
   a filter mounter;
   at least one mechanical separator;
   a UV source mounter; and
   a catalyst coating inside the filter,
   wherein the filter mounter is configured to install the filter in connection with an intake opening of an air ventilation duct,
   wherein the at least one mechanical separator is configured to separate solid impurities from flowing air,
   wherein the catalyst coating, together with UV light generated by a UV source installed in the UV source mounter, is configured to transform in photocatalysis a physical state of grease flowing into the ventilation duct along with the airflow pre-scrubbed by the at least one mechanical separator, and
   wherein the at least one mechanical separator is a rotatable perforated plate coated at least partially with the catalyst coating, and the UV source mounter is installed in connection with the at least one mechanical separator such that the UV light of the UV source and the catalyst coating of the at least one mechanical separator together are configured to fragment grease flowing along with the pre-scrubbed airflow.

2. The filter according to claim 1, wherein the filter houses a coated portion, a surface thereof at least partially covered with the catalyst coating and/or which can be fitted with at least one removable surface panel covered with the catalyst coating.

3. The filter according to claim 2, wherein the UV source mounter is installed in connection with the coated portion, and the coated portion is a chamber portion in attachment with the filter mounter.

4. The filter according to claim 1, wherein the catalyst coating comprises at least titanium dioxide or silver sulfate.

5. The filter according to claim 1, wherein the UV source mounter is installed in connection with a coated portion, and the coated portion is an internal surface of the filter mounter.

6. The filter according to claim 3, wherein the rotatable perforated plate is fitted to the filter in such a way that the chamber portion lies between the perforated plate and the filter mounter.

7. The filter according to claim 1, wherein the UV source generates non-ozone producing UV light.

8. The filter according to claim 3, wherein the chamber portion has a surface area in a direction of the airflow which is at least equal to a surface area of the filter mounter in the direction of the airflow and/or the filter mounter has a height (h) that is 0.25×a diameter (d) of the filter mounter.

9. A filtering method for grease filtering with an air filter according to claim 1, said method comprising at least following steps of:
   presenting the UV source mounter in connection with the at least one mechanical separator, the at least one mechanical separator having been coated at least partially with the catalyst coating; and
   transforming, by the catalyst coating together with UV light generated by the UV source installed in the UV source mounter, a physical state of grease flowing into the ventilation duct along with the mechanically pre-scrubbed airflow.

10. A filter system (200) for grease filtering, said system comprising:
   at least one air filter, including
      a filter mounter,
      a rotatable perforated plate,
      a UV source mounter, and
      a catalyst coating inside the filter,
      the filter mounter configured to install the filter in connection with an intake opening of an air ventilation duct,
      the rotatable perforated plate configured to separate solid impurities from flowing air,
      the catalyst coating, together with UV light generated by a UV source installed in the UV source mounter, configured to transform in photocatalysis a physical state of grease flowing into the ventilation duct along with the airflow pre-scrubbed by the rotatable perforated plate,
      the rotatable perforated plate being coated at least partially with the catalyst coating, and
      the UV source mounter installed in connection with the rotatable perforated plate such that the UV light of the UV source and the catalyst coating of the rotatable perforated plate together are configured to fragment grease flowing along with the pre-scrubbed airflow;
   and a control unit for controlling the at least one air filter.

11. The filter according to claim 1, wherein the at least one mechanical separator is directly exposed to the UV light generated by the UV source.

12. The filter according to claim 11, wherein the at least one mechanical separator is a perforated plate, which is configured to be rotated by a motor.

13. The filter system according to claim 10, wherein the rotatable perforated plate is directly exposed to the UV light generated by the UV source.

14. The filter system according to claim 13, wherein the rotatable perforated plate is rotated by a motor.

* * * * *